July 14, 1936.  A. A. GRINNELL  2,047,682
SEAT CONSTRUCTION
Filed Oct. 24, 1933  2 Sheets-Sheet 2
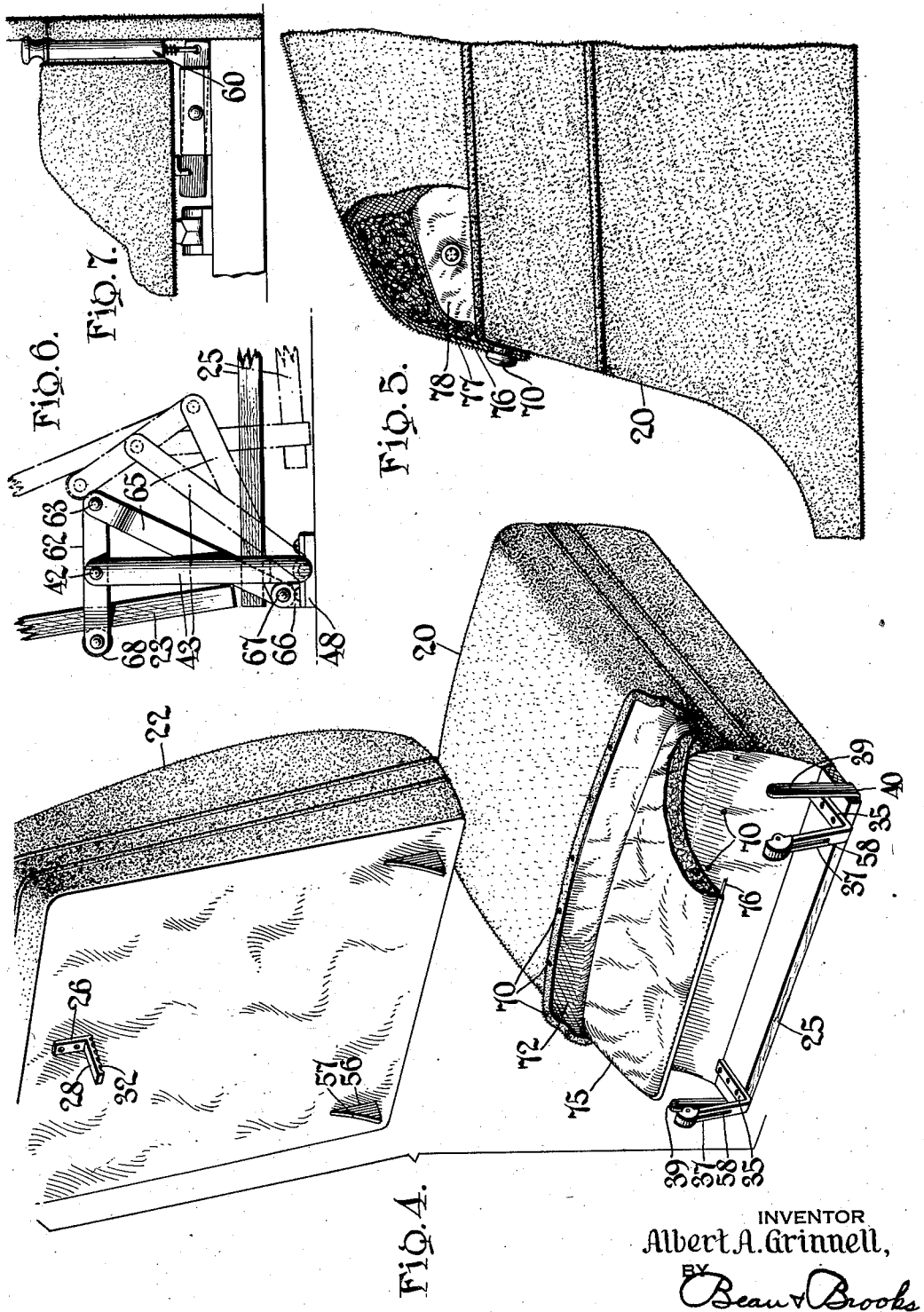
INVENTOR
Albert A. Grinnell,
BY
Beau & Brooks
ATTORNEYS Patented July 14, 1936

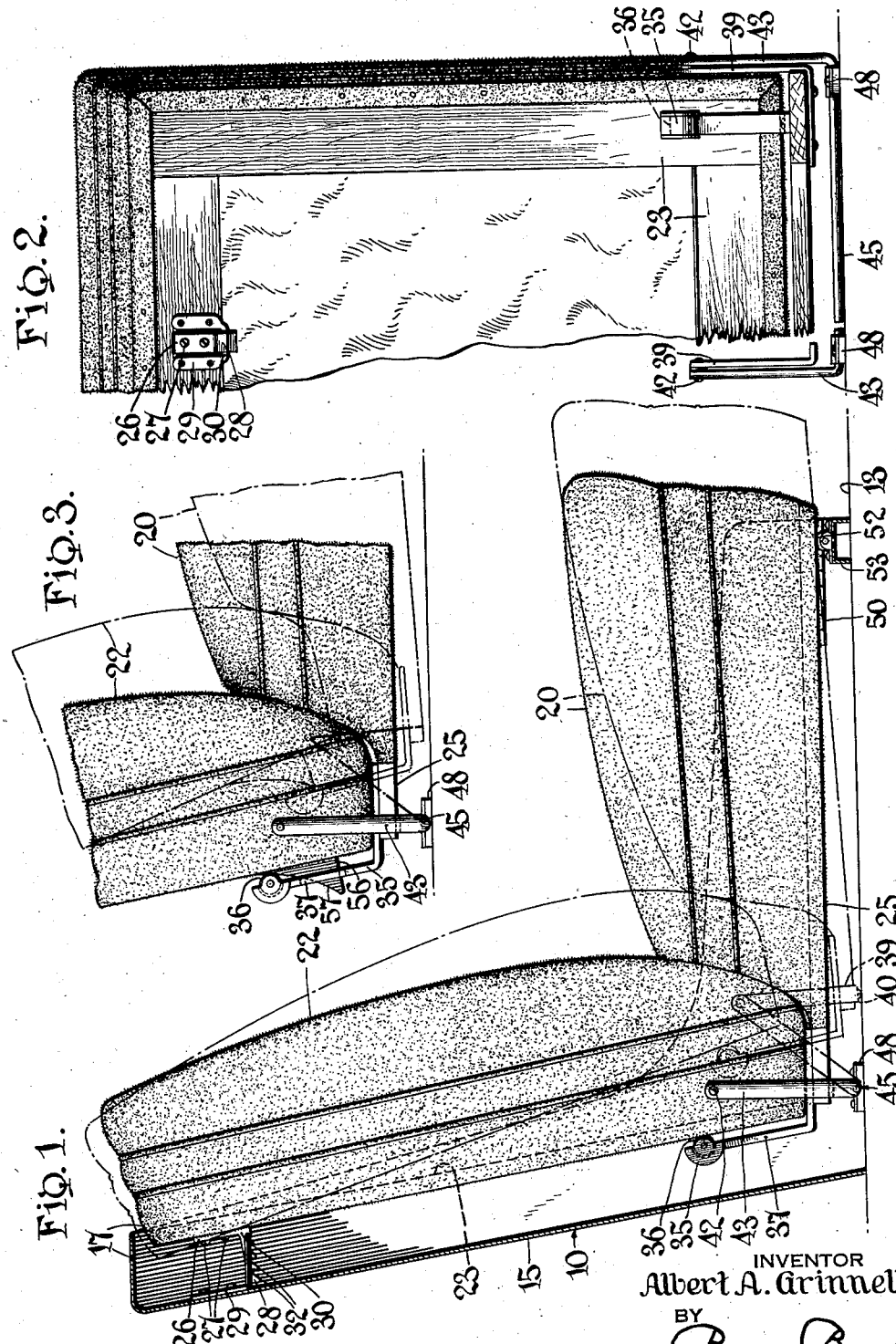

2,047,682

UNITED STATES PATENT OFFICE 2,047,682

SEAT CONSTRUCTION

Albert A. Grinnell, Medina, N. Y., assignor to Whedon, Inc., Medina, N. Y.

Application October 24, 1933, Serial No. 695,026

4 Claims. (Cl. 155—116)

This invention relates to adjustable seats for vehicles and the like, and it has particular relation to a seating structure wherein supporting members, seat bottom and back can be relatively moved to conform comfortably to various sizes and physical peculiarities of different types of persons in such manner that they can assume upright, reclining or semi-reclining positions with ease and comfort.

Persons traveling in various types of vehicles frequently desire to change their postures to promote ease in driving a vehicle or to counteract tiresomeness which occurs as a result of sitting in one position for an extended length of time. It is known that various types of adjustable seat structure have been designed previously with varying degrees of success. This invention is concerned with the provision of an improved adjustable seat structure wherein an occupant may adjust the seating elements to provide comfortable upright seating posture, or the seat may be so adjusted that the seat bottom is moved, as to its angular relation to the horizontal, to lower or raise portions thereof according to physical characteristics of the individual, while at the same time, providing for adjustment of the seating elements to such position as to permit the occupant to assume the various postures referred to.

One of the important advantages of the invention involves the relationship to the steering wheel of a vehicle and the adjustable portions of the seat structure, together with the relationship of these elements to the vehicle control pedals whereby persons of various degrees of stoutness or other physical peculiarities can be comfortably positioned without interference of parts of the anatomy with the steering wheel, and at the same time, providing entire freedom and ease of manipulation of the person's feet upon the pedals.

Another feature of the invention includes special structure of seat cushion in which a supplemental cushion member is removably applied to compensate for wear or seat sagging that may be the result of long use. Thus the combined original seat and the supplemental seat become a complete unit having seating qualities satisfactorily commensurate with those of the original new seat structure.

Still another feature of the invention includes controlling structure which insures proper closely contacting relationship approximate junction between the seat bottom and seat back in various positions of their adjustment.

In the drawings:

Fig. 1 is a side elevation of a seating structure having its back supporting members shown in cross section;

Fig. 2 is a fragmentary rear elevation of the seat back with portions of the seat frame shown in cross section;

Fig. 3 is a fragmentary view similar to Fig. 1 and illustrating additional features for compensating for the tendency of the seat back and bottom to separate;

Fig. 4 is a fragmentary exploded view of the seat back and bottom with portions broken away to illustrate the manner of inserting a supplemental seat pad;

Fig. 5 is a fragmentary view, partially in cross-section of the seat bottom with a supplemental seat inserted therein;

Fig. 6 is a fragmentary elevation of an additional seat back actuating mechanism; and Fig. 7 is a fragmentary elevation of an adjusting device for the front portion of the seat bottom.

In practicing the invention, a seating structure or unit 10 is so constructed that it is adapted to be incorporated in a vehicle, as well as to be used in conventional chair construction. A support 13 shown in the form of a vehicle body floor rigidly carries a rearwardly inclined supporting member 15 having forwardly extending flanges 17 to provide a receptacle for receiving a seat back 22, which together with a seat bottom 20, constitute a movable seat structure.

Substantially upright and horizontal frame structures 23 and 25, respectively, constitute rigid portions of the seat back and bottom and the upper or upright frame structure 23 has a bracket 26 secured to the central upper portion thereof, as indicated at 27. A rearwardly extending rack bar 28 extends rigidly or integrally with the bracket for adjusting the upper portion of the seat back forwardly or rearwardly, depending upon the size of the person to be seated and upon whether such person is to have an accentuated upright or reclining posture.

In this arrangement an angular bracket plate 29 is rigidly secured to the back support 15 and is provided with a forwardly extending rigid loop 30 for engagement with or between any two adjacent teeth 32 of the rack bar 28, thus providing for pivotal suspension of the upper portion of the seat back.

The rear portion of the seat bottom 20 is provided on or adjacent each edge with a metal angle plate 35 rigidly secured to the frame 25, and has a roller 36 mounted in its upwardly extending end portion 37, which is of such thickness and metallic characteristics as to be resilient, although of sufficient stiffness to insure proper support of the rear bottom portion of the seat back. Each roller 36 bears against the rear portion of the frame 23.

Angular stirrups 40 having upwardly extending arms 39 are rigidly secured upon the lower or bottom portion of the bottom seat frame 25 and upper end portions of the arms 39 are provided with pivotal connections 42 for pivotal support upon the upper ends of upright arms 43 of a U-shaped transverse carrier or rocker 45 in the structure of which the arms 43 pivot. Bearing brackets 48 rotatively supporting the transverse portion of the rocker 45 are bolted to the floor support 13. The rocker 45 including the upright arm 43 is substantially rigid and moves as a unit in bearing brackets 48.

Seat supporting rails 50 secured to the lower surface of the bottom frame 25 rest upon rollers 52 carried adjacent opposite sides of the seat bottom upon a transverse frame member 53 that is secured to the floor 13.

The construction and arrangement of the roller supported front portion of the seat bottom 20 is substantially the same as that shown in my copending application Serial No. 688,404, filed September 6, 1933, and in order to maintain or lock the seat bottom in various horizontal positions upon the rollers, an adjusting device 60 like that fully described in the copending application is provided.

In the position of the structural elements as shown in Fig. 1, the seat structure is adjusted for accommodating a relatively tall person to be seated in a relatively erect posture. If the person so seated desires a more relaxed or reclining position, the adjusting device 60 is manipulated to provide for free movement of the seat upon the rollers 52 and rocker 45, and then by pressing the shoulders rearwardly against the upper portion of the seat back 22, concurrently with a forward hip movement, the seat back is moved pivotally about the connection between the rack member and loop 30 to a more inclined position, as indicated by the broken lines of Fig. 1. In this movement the seat bottom 20 is also shifted forwardly to the broken line position shown in this figure, and the forward edge of the seat 20 is tilted slightly upwardly while its rear edge is moved slightly downwardly. The action of the rocker 45 in this adjustment is such that the upwardly extending arms 43 are tilted forwardly about the rocker bearing in the plates 48. As each upper pivotal connection 42 serving as a suspension point for the rear of the seat bottom 20 follows a forward and gradually increasing downward path of movement, the rear portion of the seat is thus lowered. The angle plates 35 with their rollers 36 draw the lower end of the seat back forwardly while the rollers move upon the rear of the seat frame 25.

Since the lower end of the seat bottom moves downwardly and forwardly while the lower end of the seat back moves forwardly and upwardly, there is a tendency toward separation at the junction of the seat back and bottom. Inherent yieldability and compressibility of the seat material compensate for a greater part of this separation. However, as shown in Figs. 3 and 4, the junction portions of the seat back and bottom can be maintained in proper contacting relation by means of a pair of cam rails 56 each of which has a surface 57 curving downwardly and rearwardly from the normal position of the roller 36 upon the frame. This surface serves as a cam upon which the roller rides. A slot 58 formed in the upwardly extending end portion of each plate 35 receives the rail therethrough and prevents interference among the operating parts. Thus, it will be apparent that the rollers acting upon the cam surfaces move the lower portion of the seat back in a forward direction at an increased rate commensurate with the movement of the lower rear end of the seat bottom. The operation of course is reversed when the seat structure is moved from a forward position to a rearward position.

Another form of compensating device shown in Fig. 6 includes a bar or lever 62 having an intermediate pivotal connection coincidental with the pivotal connection 42 upon the upper end of the arm 43, and an end pivotal connection 63 upon the upper end of a link 65. An ear 66 provided rigidly upon the plate 48 has a pivotal connection 67 to the lower end of the link 65. The free end of the lever 62 has a roller 68 mounted thereon for constant contact upon the rear side of the frame 23.

It will be observed that each pivotal connection 67 is spaced slightly to the rear and upwardly from the bearing axis of the rocker 45 in the bearing plates 48, and hence, in rocking the arms 43 forwardly to the broken line position of Fig. 6, the free end of the lever, together with the roller 68, will move toward a vertical position at a progressively increasing rate. Hence, the roller 68 will move the lower portion of the seat back forwardly at a rate commensurate with the movement of the seat bottom to maintain the normally contacting junction portions of these two members in close contact with each other.

As best shown in Figs. 4 and 5, the seat bottom 20 is provided with snap fasteners 70 which can be loosened to open the rear of the seat bottom cover 72. Incidental to its use, the original seat bottom may sag and become worn to the discomfort of persons seated thereon, or to such extent that the cover becomes loose, and to compensate for this disadvantage a supplemental cushion or pad 75 having a flexible metal frame or hoop 76 surrounding it is inserted into the cover 72. This hoop is sufficiently flexible and resilient to permit distortion of the cushion for forcing it into the seat cover and maintains proper form of the cushion. The seat cushion has a marginal portion 77 which rests against an upright wall 78 of the inner material of the seat. The cover or flap portion of the seat bottom is normally pressed against the lower portion of the seat back and the latter protects the fasteners against accidental opening. This supplemental cushion may be replaced from time to time if it becomes unduly worn.

Although only illustrative structural arrangements have been shown and described in detail, it will be apparent to those skilled in the art that the invention is not so limited, but that various changes may be made therein without departing from the spirit of the invention or from the scope of the appended claims.

I claim:

1. In a seating structure, a seat back bodily removable in substantially an upward direction, means for pivotally suspending the seat back at its upper portion, a seat bottom having a roller support adjacent its forward extremity for guiding said seat bottom in forward and rearward movement, a rocker having upwardly extending arms, bearing means for supporting the rocker, means for pivoting the rear portion of the seat bottom to the upper ends of the rocker arms whereby the pivotal connections of the seat bottom upon the rocker arms are movable forwardly and downwardly about the bearing means, actuating means connected to the seat bottom and normally bearing against the lower portion of the seat back to move said portion forwardly in response to forward movement of the seat bottom, and means provided on the lower portion of the seat back and cooperating with the actuating means to increase the ratio of forward movement of the lower portion of the seat back with respect to that of the seat bottom.

2. In a seating structure, a seat back bodily removable in substantially an upward direction, means for pivotally suspending the seat back at its upper portion, a seat bottom having a roller support adjacent its forward extremity for guiding said seat bottom in forward and rearward movement, a rocker having upwardly extending arms, bearing means for supporting the rocker, means for pivoting the rear portion of the seat bottom to the upper ends of the rocker arms whereby the pivotal connection of the seat bottom upon the rocker arms is movable forwardly and downwardly about the bearing means, an actuating member having a roller thereon and connected to the rear portion of the seat bottom said roller bearing in rolling relation against the lower portion of the seat back, and a cam member provided on the lower structure of the seat back and contacting the roller to provide actuation of the seat back in its forward and backward movement in response to the movement of the seat bottom with its actuating member.

3. In a seating structure, a seat back bodily removable in substantially an upward direction, means for pivotally suspending the seat back at its upper portion, a seat bottom having a roller support adjacent its forward extremity for guiding said seat bottom in forward and rearward movement, a rocker having an upwardly extending arm, bearing means for supporting the rocker and providing an axis of pivoting of the rocker arm, means for pivoting the rear portion of the seat bottom to the upper end of the rocker arm whereby the pivotal connection of the seat bottom upon the rocker arm is movable forwardly and downwardly about the bearing means, an actuating member pivotally connected to the rocker arm, a link pivotally connected to the actuating member, means for pivotally supporting said link adjacent the axis of pivoting of the rocker arm, and means on the actuating member for bearing against a portion of the seat back whereby a constant rate of pivotal movement of the rocker arm swings the lower end of the seat back at a progressively changing rate.

4. In a seating structure, a seat back and seat bottom movable forwardly and rearwardly, means for supporting the forward portion of the seat bottom for movement in a predetermined path, the lower portion of the seat back freely contacting the rear portion of the seat bottom to provide for bodily lifting the seat back from the seat bottom, a rocker having normally upwardly extending portions movably supporting the rear portion of the seat bottom, means for pivotally supporting the rocker, means pivotally suspending the seat back at its upper portion to provide swinging movement of the lower portion of the seat back, the upper portion of the seat back resting upon said means whereby the seat back can be lifted bodily therefrom, the freely contacting portions of the seat back and seat bottom including compensating means cooperating therewith for relatively varying the rate of movement of the adjacent portions of the seat back and seat bottom in their forward and rearward movement and without interfering with freely lifting and removing the seat back from the seat bottom, and from the seating structure.

ALBERT A. GRINNELL.